¹ United States Patent Office 3,121,331
Patented Feb. 18, 1964

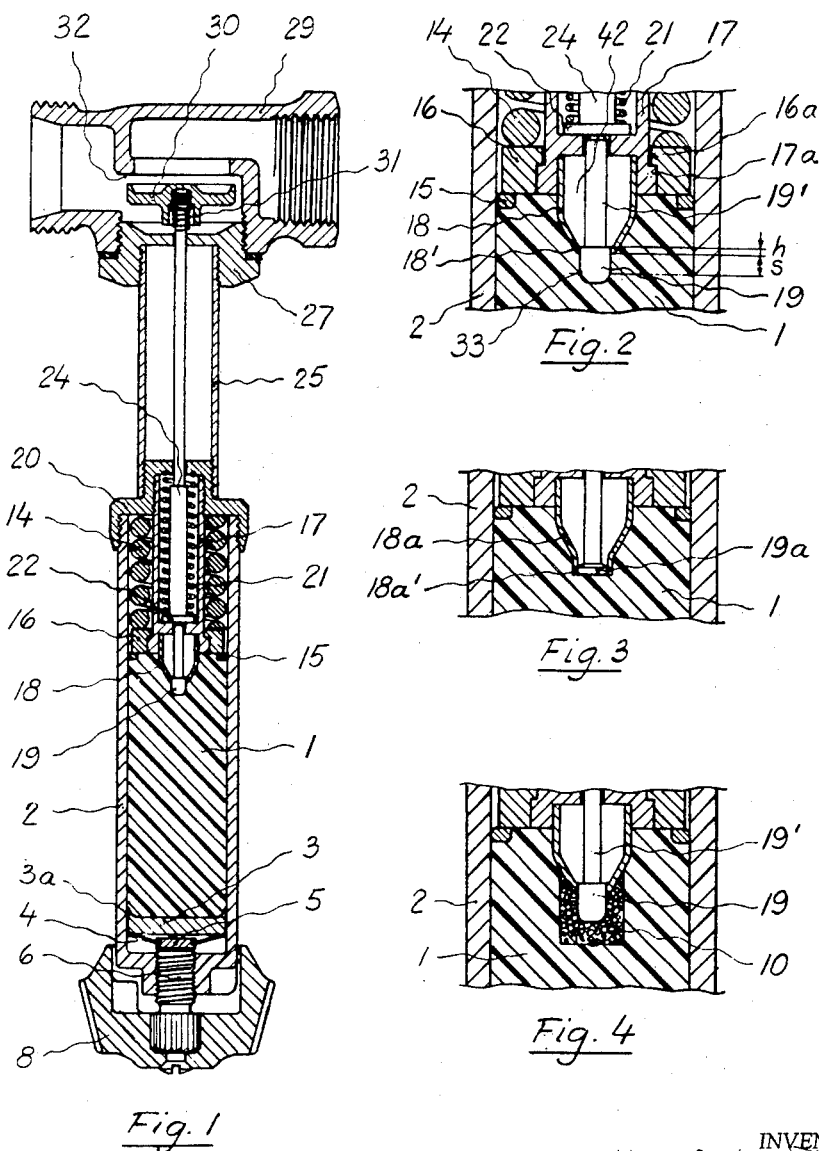

3,121,331
THERMOSTAT
Baltzar Carl von Platen, Gotgatan 16, Stockholm, Sweden
Filed May 3, 1960, Ser. No. 26,544
12 Claims. (Cl. 73—363)

The present invention relates to thermostats of a type which can be used for many purposes such as for regulating the temperature in a room, refrigerator or other enclosure by acting upon a valve or electrical switch in the conventional way.

One object of the invention is to construct a thermostat which can be inexpensively manufactured and which will be of small size, but one which nevertheless has the same high degree of accuracy which could previously be obtained only in rather complicated thermostats of more expensive construction. Another object of the invention is to provide a thermostat of sturdiness and long-lasting characteristics.

The thermal expanding and contracting substance in some thermostats is usually a liquid contained within a bellows arrangement. The advantage of such an arrangement is that no sealing problems exist as long as the bellows arrangement remains unruptured. The disadvantages are that it often causes the accuracy to diminish, that it is expensive and sensitive. It was found that these disadvantages might be reduced by the use of a simple cylinder and piston, but such an arrangement was not found practical because of the inability to solve sealing problems.

The answer to most of the problems consists in the use of a cylinder and piston, with the liquid normally used replaced by very soft rubber. By such an arrangement the sealing problem is solved since the rubber molecules or cells are bound together, forming long chains which act like cable bridges spanning the space between the piston and the cylinder, thus preventing the rubber from leaking out. But with this arrangement another difficulty arose which consisted of friction caused by the fact that rubber is not a liquid but only a substance having some of the characteristics of a semi-liquid. The major part of the rubber behaves as if it were a real liquid, that is, from a practical point of view it does not cause any friction. But the remainder of the rubber, consisting of a small part in the area of the end of the piston, does not behave in that way. Here was where the friction occurred, causing the problems hitherto unsolved.

Two important facts may now be pointed out. The thermal expanding and contracting substance shall be yielding, at least in the neighborhood of the end of the piston. Soft rubber is an example, and probably the best one of such a substance. The diameter of the piston employed should always be smaller than that of the rubber container. The friction is of two kinds namely, external friction between the rubber and the movable piston, and internal friction within the rubber itself. The first type of friction provides a problem to be solved and the second kind presents another problem. The solutions to both of the problems will make it possible to reduce the total friction. Consequently the technical effects of each of these solutions will be similar. Partly for that reason and partly for the sake of ease of survey, distinctiveness and simplicity, these two types of friction, together with the two problems and the solutions involved, will be described simultaneously. The figures for the two solutions are identical. The present invention refers to both problems.

The first kind of friction, or that between rubber and piston, is dependent upon the total contact surface between rubber and the piston and also upon its form. When the thermostat is new, this surface is equal only to that part of the piston which enters in the rubber. When the thermostat has been in use for some time however, the rubber becomes a little worn and a fine film of rubber dust enters into the space between the piston and the cylinder, causing the friction between these two bodies to increase considerably. Consequently, to the total contact surface mentioned above, must be added the original contact surface between piston and cylinder, since this surface, as a result of the wearing of the rubber, is changed into a contact surface between the piston and rubber dust. The first kind of friction, or that between piston and rubber, can be greatly reduced by making the total contact surface between these two bodies as small as is technically possible, aided also by giving this surface a suitable form.

From experiments made in connection with the present invention, it has been found that the piston which enters into the rubber substance, must not extend thereinto for a distance of more than about four times the diameter of that part of the piston. More precisely expressed, it has been found that the maximum value $A_1$ of the magnitude of one continuous part of the piston's closed cylindrical surface—which continuous part extends from the piston's tapered end in the container to the boundary line of the cylinder's inside surface farthest from said end shall be less than sixteen and preferably two to five times the value $A_2$ of the piston's cross-sectional surface, thus $A_1/A_2 \leqq 16$.

The second kind of friction, the internal friction in the rubber, can also be reduced. As a principle for the solution of this particular problem it has been found that the wall through which the piston extends into the container, must have a funnel, or frustro-conical form in the neighborhood of the end of the piston. The smaller end of this funnel or frustro-conical body is directed toward the rubber, which is consequently in contact with this end. The angle of the truncated cone's theoretical point should be as small as possible. The geometric axes of the cone and the piston coincide.

Referring to the accompanying drawing, wherein an illustrative embodiment of the invention is shown, FIG. 1 shows an axial section of a thermostat for controlling the temperature in a room or other enclosure;

FIG. 2 shows an axial section on an enlarged scale through the central part of one embodiment of the invention.

FIG. 3 shows a variation of a detail.

FIG. 4 shows another variation of a detail.

In FIG. 1 of the drawing, the rubber is indicated at 1. The main part of the rubber container consists of the tube 2, preferably but not necessarily composed of aluminum as this metal is one of those materials which reflect heat rays. A thin piston is shown at 3, with an edge of the same indicated at 3a. This piston 3 is in constant contact with a spring 4, which is appropriately fixed to a disc 5 maintained in constant contact with a screw 6. Normally the parts 3 and 5 are in contact with each other. On the screw 6 is fixed a hand-wheel or knob 8.

The upper portion of the space within the container 2 containing the rubber 1 is limited by the elements shown at 15, 16, 17, 18 and 19. The element 15 (shown clearly in FIG. 2) is a ring held by the rubber pressure against another ring 16, the flange 16a of which is pressed by a coil spring 14 against a corresponding flange 17a of a tube 17. In a central hole in the end wall of this tube 17 a funnel-like body or funnel 18 is fixed. Its lower part is cone-shaped. The upper end of the tube 17 is fixed to a cover or cap 20, which is threaded or otherwise fixed on the cylinder 2. The upper end of the spring 14 rests against this cover or cap 20. Another and weaker coil spring 21 is situated inside of the tube 17 and the upper end of this spring 21 rests against the cover or cap 20. The lower end of the spring 21 rests on a flange 22 on a rod 24.

The piston shown at 19 fits in the central hole of the funnel 18. The small cylindrical part of this funnel, which is in contact with the piston 19 is indicated at 18'. This part 18' functions as a cylinder enclosing the piston and may be referred to as a cylinder in spite of the fact that this cylinder in this embodiment of the invention is shorter than the piston 19. In this connection it may be pointed out that the working part of such a piston is a cylinder from a geometrical, but not technical, point of view. The cross section of the piston's cylindrical surface may be a circle, square, ellipse or other shape, but it is naturally preferable as a circle.

The upper part 19' or the stem of the piston 19 may be made thinner than the piston. It rests against the rod 24 and is pressed against it by the pressure of the rubber against the piston 19. On the cover or cap 20 is fixed a tube 25 made of a poor heat conducting material such as stainless steel. The upper end of the tube 25 is fixed to a body 27 and this is threadably attached to a housing 29. On the upper end of the rod 24 is fixed a valve head 30, by means of a spring 31, thus establishing a flexible connection, enabling the valve head to flexibly adjust itself to seal against the seating 32.

Inside of the funnel 18 is a cavity or space 42. This space, as well as the spaces in which the springs 14 and 21 are located, and also the space inside of the tube 25, are filled with a grease of such nature that it does not affect the rubber. Some silicon greases are useful for the purpose. The grease prevents contact between the rubber and water in the heating system. The spaces above mentioned are arranged to conveniently communicate with one another in some way. If the space wherein the spring 14 is located is not to communicate with the other spaces above mentioned, it must either communicate with surrounding atmosphere, or it may not be filled with the grease, but can be filled with a gas such as air. The minimum pressure in the rubber is determined by the spring 4, the maximum by the spring 14 and the normal by the spring 21. The minimum pressure must be higher than the pressure of the water in the heating system. Thus, the water is prevented from leaking out. The tube 25 may also contain a lining of glass or other poor heat-conducting substance. Thereby the amount of the expensive silicon grease required will be reduced. Between the silicon grease and the hot water a thin membrane of material such as Teflon may be arranged when necessary.

As will be seen in FIG. 2, the height $h$ of the cylindrical contact surface between the piston 19 and its cylinder 18' is very small. Experiments have shown that it ought to be not more than 0.2 or 0.3 mm. When the piston's 19 diameter is 3 mm., the space between the piston and its cylinder (bodies 19 and 18') is about 0.03 mm. This is a special case, but it is to be considered as a typical example in connection with this invention. The most convenient width of the space required between the piston and its cylinder is, among others, a function of the pressure in the rubber.

The thermostat functions substantially as follows:

The normal pressure in the rubber is approximately of the magnitude 10–16 kg./cm.$^2$. Assuming that the valve 30 is open and when the temperature rises, the piston is pressed by the rubber body 1 against the force of the spring 21, thereby closing the valve 30. When the temperature lowers, the piston returns and the valve 30 opens. The rubber eventually becomes worn by this reciprocation of the piston caused by changes in temperature. As mentioned heretofore, rubber dust will become forced into the space between the piston 19 and the cylinder 18', causing the friction between these two bodies to materially increase. This friction is a function of the friction coefficient between the piston and the jammed rubber dust, the piston's diameter $d$ the said height $h$ and the space between the piston and cylinder. In this function the friction coefficient and diameter $d$ will appear in about the first power. But the height $h$ will appear in a greater power. The explanation for this is that the maximum pressure of the jammed rubber dust increases with the height $h$ while it is approximately independent of the diameter $d$. Hence it will be readily understood how important it is that the height $h$ shall be small. The friction between the piston 19 and its cylinder 18' will increase very rapidly when the height $h$ increases. From a practical point of view it has been found that the friction, after a certain value of $h$ increases almost suddenly. When the piston's diameter $d$ increases, the height $h$ can not be allowed to increase proportionally but only to a lesser degree, as $h$ appears in the function in a greater power than 1, but $d$ in the first power.

The friction against the other part of the piston 19, which is in contact with the rubber, will be reduced to an allowable amount by making that part as small as possible. Consequently, the piston should not extend into the rubber more than necessary as heretofore described. From this it logically follows that the end of the piston shall be very near to the cylinder 18', when the piston is pushed out of the rubber as far as possible, such as when it is in its outermost or advanced position. More precisely expressed, it can be stated that a circle 33 on that part of the piston where its cylindrical surface begins or ceases, shall be very near the outer edge of the cylinder 18' such as that part of the piston in the container 2 shall be a minimum when the piston is in its outermost or advanced position.

Stops are employed to limit the movements of the piston. Movement of the piston into the rubber is limited by the flange 22 contacting against a part of the body 17 as shown in FIG. 2. In the opposite direction the valve head 30 and its valve seating 32 serve as a stop. In the event that these parts are not employed, the thicker part of the rod 24 contacting with the cover or cap 20 will serve the same purpose.

What has been herein stated also applies when the point angle of the end part of the cone is 180° such as when the piston is protruding into the rubber through a plane wall. When the angle is 0°, the piston short and its cylinder long and the piston in the interior of the cylinder, as in FIG. 3, the circle on the piston shall be near the outermost part of its cylinder when the piston is pushed into the rubber as far as possible.

The symbols $A_1$, $A_2$, $d$ and $h$ have already been defined. The maximum length of the piston's cylindrical part, and which projects into the rubber block, thus not including that part with the height $h$, which is inside the cylinder 18', may be called $s$. The following results, found from experiments, may be given.

One room thermostat for controlling the temperature in a room, was found to function very well. In this thermostat the data is: $d=3$ mm., $h=0.3$ mm., $s=6$ mm. and consequently $A_1/A_2=8.4$; rubber volume=20 cm.$^3$. About fifty other room thermostats have been constructed to February 1960 and they are functionary very well and are regulating the temperature in three small houses with the precision of ±0.4° C. In these the relevant data is: $d=3$ mm., $h=0.3$ mm., $s=2$ mm. and consequently $A_1/A_2=3$; rubber volume=20 cm.$^3$.

In a few cases, when the standard of precision may be low, such as for controlling the water temperature in a motor-car radiator, $A_1/A_2$ may be as great as 16, $A_1/A_2 \leqq 16$, and the maximum value of the height $h$ as great as the diameter of the piston.

When the rubber gets worn, rubber dust will get into the cavity 42 inside of the funnel 18. Only a small quantity of rubber dust is enough to render the thermostat inoperative or at least inaccurate if the height $h$ is not below a certain value, the value at which the inaccuracy or inoperativeness starts. The cavity 42 is small, mostly of the magnitude of ½ cm.³, but large enough to insure that the rubber dust will not be put under pressure there. Consequently it does not cause any noticeable friction against the part 19' of the piston. The silicon grease contributes to reduce the first kind of friction. It will take decades before the small cavity 42 will become filled with rubber dust.

The decrease of the second kind of friction in the rubber, that is internal friction, has already been described. As mentioned, the friction is a function of the point angle of the frustro-conical part of the funnel 18. When this angle is as shown in FIG. 2, about 60°, the internal friction is reduced to a permissible value. When it is 180°, the cone or cone-like body becomes a plane disk or wall, and the friction becomes too great. When it is 0°, with the cone above mentioned replaced by a thin-walled tube, the friction is only a little less than at an angle of 60°.

The thermostat is set to different temperatures by diminishing or increasing the volume of the rubber container, that is, by turning the hand-wheel or knob 8 and consequently moving the thin piston 3.

When the temperature increases, such as during a hot summer's day, the pressure of the rubber might increase too much, if the volume was constant. Therefore, for limiting the maximum pressure an arrangement has been made by means of the two rings 15 and 16 and the spring 14. The two rings may be considered as one, because the first ring only serves to facilitate the assembling of the thermostat. When the pressure increases over a certain value, before which the valve 30 is closed, the rings 15 and 16 will move upwards, thus compressing the spring 14. On the other hand, on a cold day, when the thermostat is set at room temperature, the pressure in the rubber will diminish if the house gets cold. In such a case, the spring 4 will begin to function. It keeps the pressure above or at a certain minimum value, which as mentioned, is higher than the pressure of the water in the heating system, thus preventing the water from leaking out.

In the embodiment of the invention shown in FIGS. 1 and 2, the cylindrical contact surface between the piston 19 and the cylinder 18' had been given the small height $h$ by making the cylinder relatively short while the piston is relatively long in comparison. The opposite might be the case, that is, the piston might be made short and its cylinder made long. FIG. 3 shows such an arrangement. Therein the piston is indicated at 19a and the funnel at 18a. The cylindrical part of this type of funnel is indicated at 18a'. It is relatively long compared to the length of the piston 19a. The maximum contact surface between these two bodies has the small height $h$. The entire funnel 18a could be replaced by a cylindrical thin-walled tube with the same inner diameter as that of the cylindrical part 18a'.

The wearing of the rubber may be decreased by the use of a construction such as shown in FIG. 4. In the rubber and around the piston 19 a cavity is formed, which is filled with small particles 10 of wear-resistant material together with a lubricant. The particles might be composed of a rubber harder than that shown at 1, or they may be solids such as glass or metallic balls. Such particles or balls will yield or shift and dust created by the friction will get forced out. The lubricant used can be silicon grease or graphite.

Other variations are possible and among them are the following. Between the rubber and the piston 19 a thin skin of greater wear-resistant material than rubber may be arranged. It may, for example, be harder rubber or so-called vulcanite. This harder skin should be so thin that its internal friction may be negligible. Two or more very thin skins, with some lubricant such as graphite powder between them, may also be used.

The rubber's volume changes with the temperature. Obviously it is unimportant for the function of the thermostat from what substance this change of volume emanates, provided that the construction is not altered in the vicinity of the piston 19. For example, a cavity may be provided in the center of the rubber block, and this cavity filled with a liquid, such as silicon oil, which is inert to the rubber. Such a cavity can be made so large that the rubber block can function as a flexible container, which must however, be thick-walled in the vicinity of the piston. The rubber block and the cavity may be made relatively small, when the cavity is in communication with a bulb located outside of the thermostat. The bulb may contain the same liquid, silicon oil as an example, or in addition another liquid not mixable with and not soluble with the first liquid. Other variations of the described construction are possible without departing from the spirit of the invention as expressed in the annexed claims.

What I claim is:

1. A thermostat including a container, a cylinder located therein, a piston operative through the cylinder, the container being filled with a thermally expanding and contracting substance which at least in the area of the piston is of a yielding nature, the piston when extending through the cylinder to a maximum extent having a surface area contacting the inside surface of the part of the cylinder through which it extends and a part of its cylindrical surface contacting with the yielding substance totaling an area less than sixteen and preferably two to five times the value of the piston's cross sectional surface.

2. A thermostat as provided for in claim 1, wherein the cylinder consists of a cup-shaped member having a central opening through which the piston is operable, the piston being of greater length than the depth of the central opening.

3. A thermostat as provided for in claim 2, wherein the cup-shaped member has an open top and is hollow in its interior to thereby form a collection chamber for particles of the thermally expanding and contracting substance displaced by piston operation.

4. A thermostat comprising, a cylinder, a compressible material of soft rubber contained within the cylinder, spring means within the cylinder at one end of the rubber for urging the rubber to a controlled extent axially of the cylinder, a tube within the cylinder at the end thereof remote from said spring means, a spring surrounding the tube and operative against an end of the rubber in opposition to the spring means, a hollow cone fitted in one end of the tube and having a smaller apertured end entering the rubber, a piston axially movable through the aperture in the smaller end of the cone to enter the rubber, a coil spring within the tube for urging the piston through the aperture and toward the rubber, the piston having a stem extending through the tube.

5. A thermostat as provided for in claim 4, wherein the hollow cone is arranged to act as a collection chamber for rubber dust displaced by reciprocative movements of the piston, means at the end of the cylinder for adjusting the force exerted by the spring means.

6. A thermostat comprising, a container closed at one end, a compressible thermo-responsive material within the container, urging means arranged within the container and operative against one end of said material, screw-threaded adjusting means extending through one end of the container for regulating the pressure of the urging means, a hollow cylinder supported within the container and having an apertured conical end entering into the material, a piston axially movable through the apertured end of the cylinder, said piston normally having an end protruding beyond the end of the cylinder and entering the material, spring means urging the piston through the aperture in the cylinder and into the material.

7. A thermostat comprising, a container holding a thermo-responsive material, a hollow thin-walled cylinder having a tapered thin-walled end positioned within the container in a manner to cause the tapered end to enter into the material, said tapered end being thin-walled and having its extremity terminating in a relatively sharp edge and a piston urged through the cylinder and protruding beyond the tapered end of the same and entering the material.

8. A thermostat as provided for in claim 7, wherein the thermo-responsive material is composed of soft rubber, the tapered end of the thin-walled cylinder being frustro-conical with a central aperture through said end and with the piston extending through and protruding out of such aperture.

9. A thermostat comprising, a container, a piston, a hollow, thin-walled cylinder within the container and through which the piston is operative, said cylinder consisting of a tapered end, hollow thin-walled member having an aperture in one of its walls defined by a relatively sharp edge and through which the piston passes, a thermo-responsive substance having at least a portion of it in the vicinity of the tapered end of the piston of yielding nature, the cylinder and piston contacting said material, the part of the cylinder defining the aperture being of less height than the diameter of said piston.

10. A thermostat comprising, a container and a piston constructed according to claim 9 and wherein the height of the inside surface of the aperture in the cylinder is $\frac{1}{10}$ to $\frac{1}{15}$ of the diameter of the piston.

11. A thermostat according to claim 9, wherein the cylinder has a tapered end in contact with the thermo-responsive material, the aperture being through said end, the piston having the greater part of its length protruding beyond said end and in contact with such material, said material being at least partly composed of soft rubber.

12. A thermostat according to claim 9, wherein the thermo-responsive material has an area in the vicinity of the end of the piston composed of small particles and a lubricant and the end of the piston contacts such area.

References Cited in the file of this patent
UNITED STATES PATENTS

| | | |
|---|---|---|
| 2,112,665 | Dube | Mar. 29, 1928 |
| 2,208,149 | Vernet | July 16, 1940 |
| 2,719,675 | Terry | Oct. 4, 1955 |
| 2,810,290 | Scherer | Oct. 22, 1957 |
| 2,906,123 | Vernet et al. | Sept. 29, 1959 |